May 6, 1958  R. H. OLSON ET AL  2,833,088
GLASSWARE COOLING AND TRANSFERRING APPARATUS
Filed Aug. 31, 1954  2 Sheets-Sheet 1

INVENTOR
KEITH CONRAD
RALPH H. OLSON
BY W. A. Schaich
Leonard D. Doubier
ATTORNEYS May 6, 1958 R. H. OLSON ET AL 2,833,088
GLASSWARE COOLING AND TRANSFERRING APPARATUS
Filed Aug. 31, 1954 2 Sheets-Sheet 2
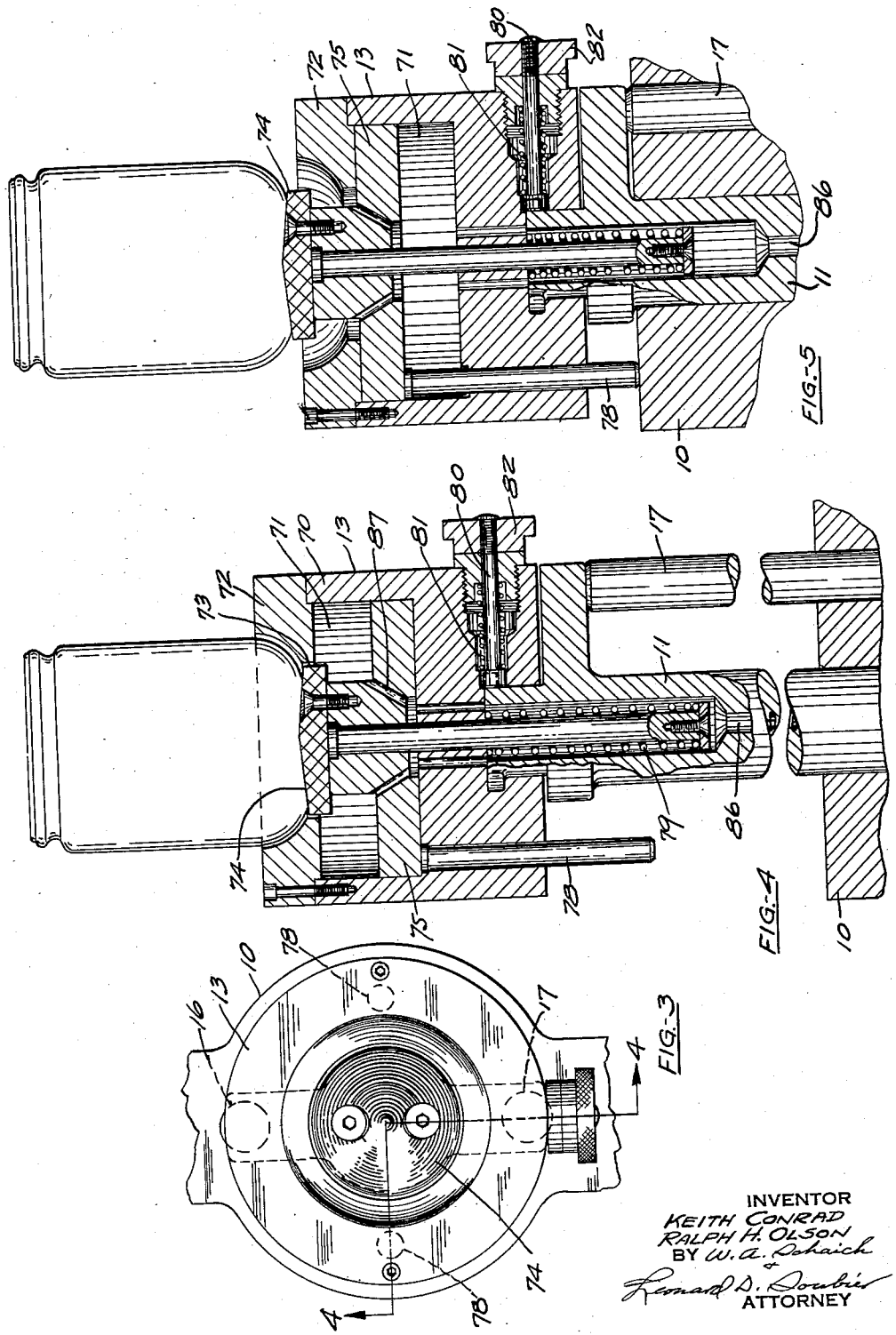
INVENTOR
KEITH CONRAD
RALPH H. OLSON
BY
ATTORNEY

United States Patent Office 2,833,088
Patented May 6, 1958

2,833,088

GLASSWARE COOLING AND TRANSFERRING APPARATUS

Ralph H. Olson and Keith Conrad, Toledo, Ohio, assignors to Owens-Illinois Glass Company, a corporation of Ohio Application August 31, 1954, Serial No. 453,291

5 Claims. (Cl. 49—14)

This invention relates to apparatus for handling glassware, and particlularly to an apparatus for cooling and transferring glassware upon its removal from a forming machine.

In the handling of glassware upon its removal from the forming apparatus and prior to its delivery to a leer or other subsequent operation, it is the usual practice to place the article at an intermediate station and apply cooling air thereto to prevent deformation of the article due to the inherent heat of the glass.

It is an object of this invention to provide an improved apparatus for cooling and transferring glassware after it has been removed from the forming apparatus.

It is a further object of the invention to provide such an apparatus wherein both the internal and external surfaces of a glass article such as a glass container are simultaneously cooled.

It is a further object of the invention to provide such an apparatus wherein the article is transferred vertically from one position to another.

Other objects of the invention will appear hereinafter.

Basically, the apparatus comprises an article support which is vertically reciprocable and has means formed therein for cooling the exterior surfaces of the glass article. The apparatus further includes means for cooling the internal surfaces of the glass article as it is moved vertically, said means moving with the support for a portion of its vertical travel.

Referring to the accompanying drawings:

Fig. 3 is a plan view of the article support;

Fig. 4 is a sectional view at the line 4—4 on Fig. 3; and

Fig. 5 is a view similar to Fig. 4 showing the parts in a different position.

Figure 2:
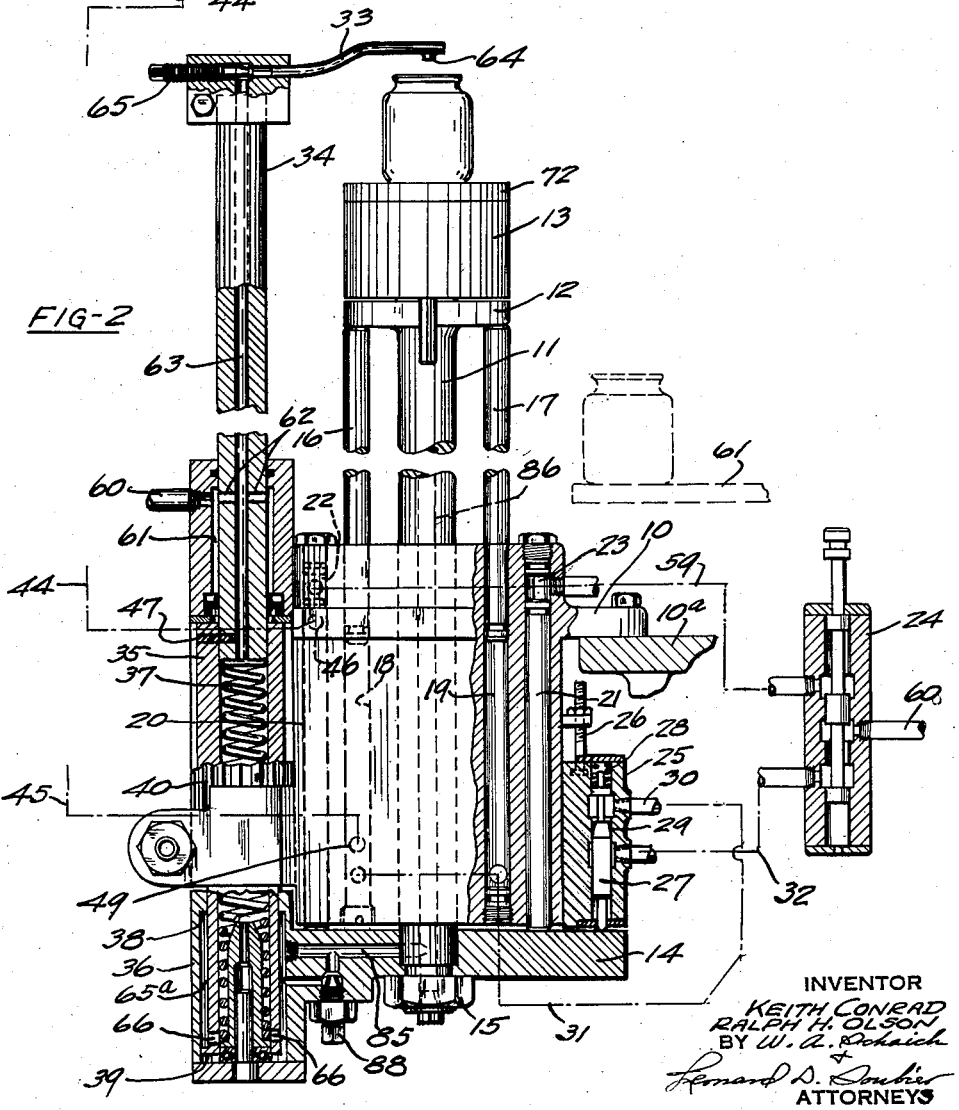
Fig. 2 is a fragmentary part sectional elevational view of the apparatus.

Referring to Fig. 2, the apparatus comprises a base 10 mounted on the stationary support bracket 10ª forming a part of a glass shaping machine. A shaft 11 vertically reciprocable in the base 10 supports an upper crosshead 12 formed on the upper end of the shaft 11 and a head 13 is releasably mounted on the crosshead 12.

A second crosshead 14 is mounted on the lower end of the shaft 11 and maintained in position relative thereto by the nut 15. A glass article positioned on the head 13 is moved vertically as presently described by the vertical movement of the shaft 11.

Upper vertical movement of the shaft 11 is achieved by rods 16, 17 contacting the under surface of the crosshead 12 and projecting downwardly into cylindrical openings 18, 19 in the base 10. The lower ends of the rods 16 and 17 are in the form of pistons whereby when fluid is applied to the cylindrical openings in the base, the rods 16 and 17 will be forced upwardly.

Downward movement of the head and shaft 11 is obtained by a second group of rods 20, 21 contacting the upper surface of the lower crosshead 14 and projecting into cylindrical cavities 22, 23 in the base 10. The upper end of the rods 20, 21 are in the form of pistons whereby when fluid is applied to the cylindrical cavities 22 and 23 above the ends of the rods, the rods 20, 21 are forced downwardly moving the crosshead 14 and in turn the shaft 11 and head 13 downwardly.

The upward and downward movement is controlled by a two-way piston type valve 24 which alternately applies fluid from a constant supply source 60 to the ends of the rods 16, 17 or 20, 21, and is actuated by a timer cam on the forming machine (not shown). A control valve is provided for limiting the upward movement of the shaft 11 and in turn the head 13, and comprises a valve body 25 positioned at one side of the base 10 and vertically adjustable relative thereto through screw 26. The valve includes a pin 27 having the lower end thereof projecting downwardly. When the shaft 11 is being moved upwardly through the crosshead 14 and at the upper limit of the desired movement, the lower end of the pin 27 is contacted by the upper surface of the crosshead 14 and moves the pin 27 upwardly relative to the valve body 25 against the pressure of spring 28. This closes the passage 29 preventing the flow of fluid from the passage 29 to the outlet 30, and thence to the inlet line 31 of the cylindrical cavities 18 and 19.

The vertical adjustment of this valve 25 through screw 26 permits variation of the time interval of contact as between pin 27 and crosshead 14, thus controlling the shifting of valve pin 27 to thereby control or limit the top or ware receiving position of head 13.

With the reception of a glass article upon the head 13, the valve 24 is actuated to reverse the fluid flow and supplies actuating fluid through line 59 to the cylindrical cavities 22 and 23 above the rods 20 and 21. The pressure of rods 20 and 21 upon crosshead 14 moves it downwardly bringing the head 13 and its glass article into horizontal alignment with the article receiving conveyor table 61. Means, not shown, which form a part of the conveyor 61 remove the article from head 13. This downward movement of crosshead 14 permits valve pin 27 to move down under spring pressure, thus reopening passage 29 and the fluid circuit from valve 24 through line 31. Thus, when valve 24 is again actuated, fluid may flow through line 32 to the lower ends of rods 20 and 21 to raise the crosshead 14 and the article receiving member 13.

As further shown in Fig. 2, the apparatus includes a nozzle arm 33 for cooling the internal surface of the glass article. The nozzle arm 33 is mounted on a shaft 34 provided for limited relative movement in the base 10. The shaft 34 is connected to a sleeve 35 which in turn is reciprocable within a hollow housing 36 forming a part of the cross head 14. A spring 37 normally urges the shaft upwardly relative to the base 10. When the crosshead 14 moves downwardly, the lip 38 on the housing 36 contacts the flange 39 on the lower end of the sleeve 35 and holds the shaft 34, and in turn moves the cooling nozzle arm 33 downwardly. A limited relative movement is provided between the crosshead 14 and the shaft 34 before the lip 38 contacts the flange 39.

Figure 1:
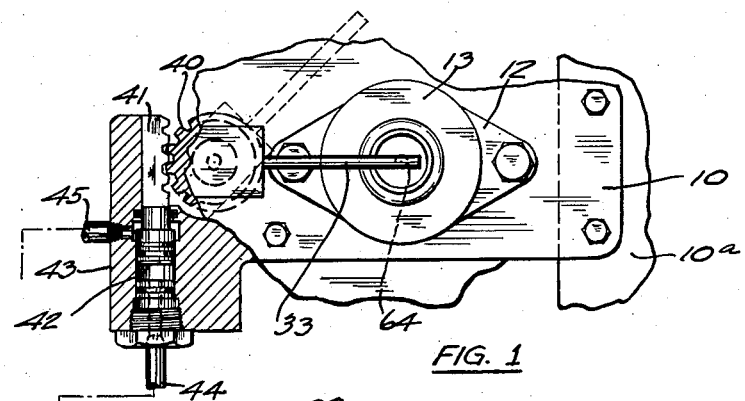
Fig. 1 is a fragmentary part sectional plan view of the apparatus.

As shown in Figs. 1 and 2, the sleeve 35 has gear teeth 40 formed on the outer surface thereof, whereby a rotary movement may be given to the shaft 34 and in turn the nozzle arm 33. This movement is supplied by means of a rack 41 meshing with the teeth 40 and moved by the piston 42 of motor 43 to which fluid is alternately applied through lines 44 and 45.

With respect to the specific operation of blower arm 33, it will be noted that as the rods 20 and 21 move downward from the position in Fig. 2, rod 20 uncovers an outlet opening 46, permitting passage of fluid through line 44 moving piston 42 in motor 43 to the position shown in Fig. 1. Thus, through rack 41 and teeth 40 formed on spline sleeve 35, the rod 34, connected to spline sleeve 35 by pin 47, is rotated bringing blower arm 33 to operative position over the glass article as in Fig. 1. The reverse operation of this specific mechanism is similar in that as rod 16 starts its upward motion it also uncovers an outlet 49 which carries fluid through line 45 to the opposite end of piston 42, moving the blower arm 33 to the dotted line position as shown in Fig. 1.

Thus, at the beginning of each stroke of the rods 16 and 20, the arm 33 is respectively moved out of and into operative position. Cooling air for blower 33 is provided from a constant source line 60 to annular chamber 61 through passages 62 into conduit 63 and through hollow arm 33 to the nozzle 64. The volume of air passing through nozzle 64 is regulated by a needle valve 65 in the conduit 63.

The cooling air for cooling the outer bottom end of the glass article is also provided through conduit 63 which, at its lower end, opens in a chamber 65a having exit passages 66.

Referring to Figs. 3, 4 and 5, the head 13 comprises a housing or body 70 having a cavity 71 therein, and the upper surface of the housing is closed by a plate 72. The plate is formed with an opening 73 and an article support 74 is positioned in the opening. The opening 73 and the support 74 are so dimensioned that an annular area is provided between the edge of the support 74 and the wall of the opening. The support 74 is mounted on a second plate 75 vertically reciprocable within the cavity 71. A pin 78 is mounted in the housing 70 and contacts the lower surface of the second plate 75. The end of the pin 78 projects downwardly out of the housing 70 whereby when the head 13 is moved downwardly the pin 78 contacts the upper surface of the base 10 causing the second plate to move upwardly relative to the plate 72. As shown in Figs. 4 and 5, the area of the plate 72 surrounding the opening 73 is so dimensioned and contoured that a limited space is provided between the walls of the opening and the outer surface of an article positioned on the support 74. The walls of the opening in plate 72 have approximately the same configuration as that of the bottom of the glass article to be positioned therein.

The second plate 75 and in turn the support 74 are urged downwardly under the action of the spring 79. The head 13 is releasably mounted on the shaft 11 by a pin 80 urged against the shaft 11 by means of a spring 81. A knob 82 is mounted on the end of the spring whereby the pin can be pulled laterally outwardly away from the head 13 to release the body from the shaft 11.

Cooling fluid such as air is supplied to the apparatus through the inlet 60 and thence downwardly through passage 63 in shaft 34, through the sleeve 35 and passages 66 to chamber 65a. The fluid then moves through a passageway 85 in the crosshead 14 to passageway 86 in the shaft 11, and thence upwardly through passages 87 to the cavity 71 of the head 13. From cavity 71 the fluid passes upwardly through the opening between plate 72 and support 74 around the bottom of the glass article. The volume of cooling fluid to head 13 may be controlled by needle valve 88. The cooling fluid also passes upwardly through a passageway 63 in shaft 34 to the cooling nozzle 64.

The operation of the apparatus may be summarized as follows:

Initially, the head 13 is in its uppermost position and the support 74 is lowered within the head 13. The nozzle arm 33 is pivoted about the axis of the shaft 34 out of register with the head 13. After an article of glassware is removed from the forming apparatus, it is placed on the support 74 in the head 13. The cooling fluid passing between the support 74 and the walls of the opening in the plate 72 serve to form a layer or blanket surrounding the lower end of the article and cooling the article.

Through the action of the valve 24, fluid is applied to the ends of the rods 20, 21 thereby causing the crosshead 14 to begin moving downwardly carrying the head 13 downwardly. The cross head 14 moves downwardly relative to the shaft 34 and the nozzle arm 33 for a limited distance, and then due to the inner action of the lip 38 and flange 39, the shaft 34 and nozzle arm 33 move together with the crosshead 14. At that time the piston motor 43 is actuated causing the nozzle 64 to be pivoted into register with the open end of the glass article positioned on the head 13. Cooling fluid is thereby supplied to the internal surfaces of the glass article.

As the head reaches its lowermost position the pin 78 contacts the upper surface of the base 10 causing the support 74 to be moved upwardly bringing the lower end of the glass article on a level with the upper surface of the plate 72. The glass article may then be removed to a horizontal surface or conveyor 61 positioned adjacent the head 13.

During this travel of the article on the head 13, cooling air is being applied both internally and externally of the ware, and in particular the application of the air to the outer bottom portions of the article is applied in a configuration film having the approximate shape of the article. In other words, the article is positioned in the contoured cavity 73 having a configuration similar to the bottom of the article, but the walls of the cavity 73 do not have actual physical contact with the glass because of the air or fluid film provided between the cavity wall and the article. Thus, the article may be cooled by a means having a similar shape but having only fluid contact therewith and therebetween.

Modifications may be resorted to within the spirit and scope of our invention.

We claim:

1. An apparatus for cooling and transferring glassware after said glassware is formed in a forming machine, which apparatus comprises a base, a shaft vertically reciprocable in said base, a head mounted on the upper end of said shaft and including a support for supporting an article of glassware, means forming a part of said head for cooling the exterior surfaces of an article of glassware positioned on the support, said shaft comprising a cross head, rods in contact with the lower surface of said cross head and projecting downwardly into cavities in the base, the lower end of said rods being in the form of pistons, whereby when fluid under pressure is supplied to the cavities below the rods, the rods are caused to move upwardly and in turn press against the cross head moving the head upwardly, said vertical shaft protruding through the lower end of said base, a second cross head mounted on the lower end of said shaft, a second series of rods in contact with the upper surface of said second cross head, said rods projecting into a second series of cavities in the base, the upper end of said second series of rods being in the form of pistons, whereby when fluid under pressure is applied to the second series of cavities the second series of rods is moved downwardly thereby forcing the second cross head downwardly and in turn moving the head downwardly.

2. The apparatus set forth in claim 1 including a nozzle for cooling the internal surfaces of the article of glassware, and means forming an operating connection between said second cross head, whereby the nozzle is moved simultaneously with the head by movement of the second cross head.

3. The apparatus set forth in claim 1 including a nozzle for directing cooling fluid against the interior surfaces of an article of glassware positioned on the support, a shaft on which said nozzle is mounted, and means providing limited movement between said shaft and the second cross head, whereby limited relative movement may be obtained between the head and the nozzle and simultaneous movement may be obtained between the head and nozzle.

4. The apparatus set forth in claim 3 including means for oscillating the shaft on which the nozzle is mounted, thereby bringing the nozzle into and out of register with an article of glassware positioned on the support.

5. The apparatus set forth in claim 1 including fluid conveying lines adapted to convey operating fluid to the opposed ends of said series of rods, a control valve interposed in the fluid operating line for said the first mentioned rods, said valve adapted for vertical adjustment on said base with respect to said second cross head, and means to adjust the actuating position of said valve relative to said second cross head to thereby regulate the upper stop position of the article support head.

References Cited in the file of this patent

UNITED STATES PATENTS

| | | |
|---|---|---|
| 1,854,471 | Hofmann | Apr. 19, 1932 |
| 1,869,920 | Soubier | Aug. 2, 1932 |
| 1,894,576 | Tremblay | Jan. 17, 1933 |
| 1,912,769 | Hansell | June 6, 1933 |
| 2,100,747 | Mowromtseff | Nov. 30, 1937 |
| 2,245,234 | Tannor | Jan. 10, 1941 |
| 2,269,060 | Mitford | Jan. 6, 1942 |
| 2,476,647 | Weschler et al. | July 19, 1949 |
| 2,519,059 | MacConnell, Jr. | Aug. 15, 1950 |
| 2,613,480 | Mongan | Oct. 14, 1952 |
| 2,660,831 | Rowe | Dec. 1, 1953 |